US008188434B2

(12) United States Patent
Ayer

(10) Patent No.: US 8,188,434 B2
(45) Date of Patent: May 29, 2012

(54) SYSTEMS AND METHODS FOR THERMAL SPECTRAL GENERATION, PROJECTION AND CORRELATION

(75) Inventor: Kevin W. Ayer, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 482 days.

(21) Appl. No.: 12/474,571

(22) Filed: May 29, 2009

(65) Prior Publication Data

US 2010/0301218 A1 Dec. 2, 2010

(51) Int. Cl.
*G01J 5/02* (2006.01)
(52) U.S. Cl. ............... 250/339.06; 359/290; 359/291; 359/292; 359/295
(58) Field of Classification Search ............ 250/339.06; 359/290, 291, 292, 295, 223, 224
See application file for complete search history.

(56) References Cited

U.S. PATENT DOCUMENTS

| 5,418,380 | A | 5/1995 | Simon et al. |
| 7,019,883 | B2 * | 3/2006 | Moon et al. ............... 359/290 |
| 7,411,717 | B2 | 8/2008 | Patel et al. |
| 2003/0161039 | A1 | 8/2003 | Fukano et al. |
| 2003/0169956 | A1 | 9/2003 | Lange et al. |

OTHER PUBLICATIONS

International Searching Authority, European Patent Office, "Annex to Form PCT/ISA/206 Communication Relating to the Results of the Partial International Search," International Application No. PCT/US2010/035821, filed May 21, 2010.

\* cited by examiner

*Primary Examiner* — David Porta
*Assistant Examiner* — Hugh H Maupin
(74) *Attorney, Agent, or Firm* — Eric A. Gifford

(57) ABSTRACT

Systems and methods for generating, projecting or correlating thermal spectra use digital micro-mirror devices (DMDs) to controllably modulate input radiation such as long wave infrared light. An optical system for creating an output spectrum based upon an input light suitably includes a grating configured receive the input light and to spread the input light by wavelength into an input spectrum. A digital micro-mirror device (DMD) is configured to receive the input spectrum and to controllably activate mirrors in the DMD corresponding to selected wavelengths of the input light. Portions of the input light having selected wavelengths can be extracted from remaining portions of the input light for the output spectrum. By selecting and activating only certain mirrors on the DMD, particular wavelengths of light in infrared or other spectra can be optically switched for any number of subsequent applications, including spectral projection, simulation of solar or other spectra, detection of chemical substances, or the like.

20 Claims, 6 Drawing Sheets

SYSTEMS AND METHODS FOR THERMAL SPECTRAL GENERATION, PROJECTION AND CORRELATION

TECHNICAL FIELD

The following discussion generally relates to optical processing. More particularly, the following discussion relates to systems and methods for generating thermal or optical spectra that can be projected or used to detect the presence of known substances.

BACKGROUND

A spatial light modulator (SLM) is any device or object that imposes any form of spatially-varying modulation on a beam of light. Many different types of spatial light modulators are used in a variety of optical systems including displays, projectors and the like. Commonly-available ferroelectric liquid crystals, for example, spatially modulate light by passing of blocking light passing through the crystal in response to an electrical potential applied across the crystal. Conventional liquid crystal displays (LCDs) exploit this concept by providing arrays of liquid crystals that can each spatially modulate visible light to make up the pixels in a displayed image.

While liquid crystals and other types of spatial light modulators have enjoyed widespread use in many different types of displays and other optical systems, conventional SLMs are often poorly suited for use in systems that process light in the non-visible spectra, such as systems concerned with thermal spectra. Conventional ferroelectric liquid crystals, for example, are often unable to process certain infrared or other non-visible wavelengths of light that are generally relevant to thermal spectral processing. While some liquid crystal SLMs have been used in various phase shifting and other limited applications, a desire remains for spatial light modulation that is capable of processing light in the infrared and other wavelengths applicable to thermal spectral processing.

It is therefore desirable to create systems, devices and methods that are capable of spatially modulating thermal spectra that including light in the infrared spectrum. These and other desirable features and characteristics will become apparent from the subsequent detailed description and the appended claims, taken in conjunction with the accompanying drawings and this background section.

BRIEF DESCRIPTION

Various systems, structures and methods for generating, projecting or correlating thermal spectra are described that use digital micro-mirror devices (DMDs) to controllably modulate input radiation such as long wave infrared light. By selecting and activating only certain mirrors on the DMD, particular wavelengths of light in infrared or other spectra can be optically switched or otherwise modulated for any number of applications, including spectral projection, simulation of solar or other spectra, detection of chemical or other substances, and/or the like.

In one embodiment, an optical system for creating an output spectrum based upon an input light suitably comprises a grating or other spreading optics configured receive the input light and to spread the input light by wavelength into an input spectrum. A digital micro-mirror device (DMD) is configured to receive the input spectrum and to controllably activate mirrors in the DMD corresponding to selected wavelengths of the input light. Portions of the input light having selected wavelengths can be extracted from remaining portions of the input light for the output spectrum.

In another embodiment, an optical system for projecting a programmable thermal spectrum is described. The optical system suitably comprises a light source configured to provide an input light and a grating configured to spread the input light by wavelength into an input spectrum. The input spectrum may lie at least partially within the infrared spectrum. The optical system also comprises a first digital micro-mirror device comprising a first substrate and a first array of micro-machined mirrors arranged on the first substrate, wherein the first array of micro-machined mirrors is configured to receive the input spectrum and to reflect a selected portion of the input spectrum in response to a first control signal such that only those portions of the input spectrum having the selected wavelengths are extracted from remaining portions of the input light. A spatial integrator is configured to receive the extracted portions of the input spectrum and to integrate the extracted portions to create the programmable thermal spectrum. A second digital micro-mirror device that comprises a second substrate and a second array of micro-machined mirrors arranged on the second substrate is also provided, wherein the second array of micro-machined mirrors is configured to receive the programmable thermal spectrum and to reflect only a selected spatial portion of the programmable thermal spectrum in response to a second control signal. Projection optics are configured to project the selected spatial portion of the programmable thermal spectrum.

Still other embodiments provide a method for optically creating a programmable thermal spectrum based upon a received input light. The method comprises spreading the input light by wavelength into an input spectrum. In various embodiments, the input spectrum lies at least partially within the infrared spectrum, and may include relatively long wave infrared radiation. A plurality of mirrors on a digital micro-mirror device are controlled (e.g., by a computer or other control system) to reflect only portions of the input spectrum corresponding to a plurality of selected wavelengths of the light and to thereby extract only portions of the input light having the selected wavelengths from remaining portions of the input light for programmable thermal spectrum.

The various implementations described herein may be enhanced or modified in many different ways to create any number of alternate but equivalent embodiments. Several examples of other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of an exemplary optical system for generating and projecting thermal spectra;

DETAILED DESCRIPTION

Figure 1:
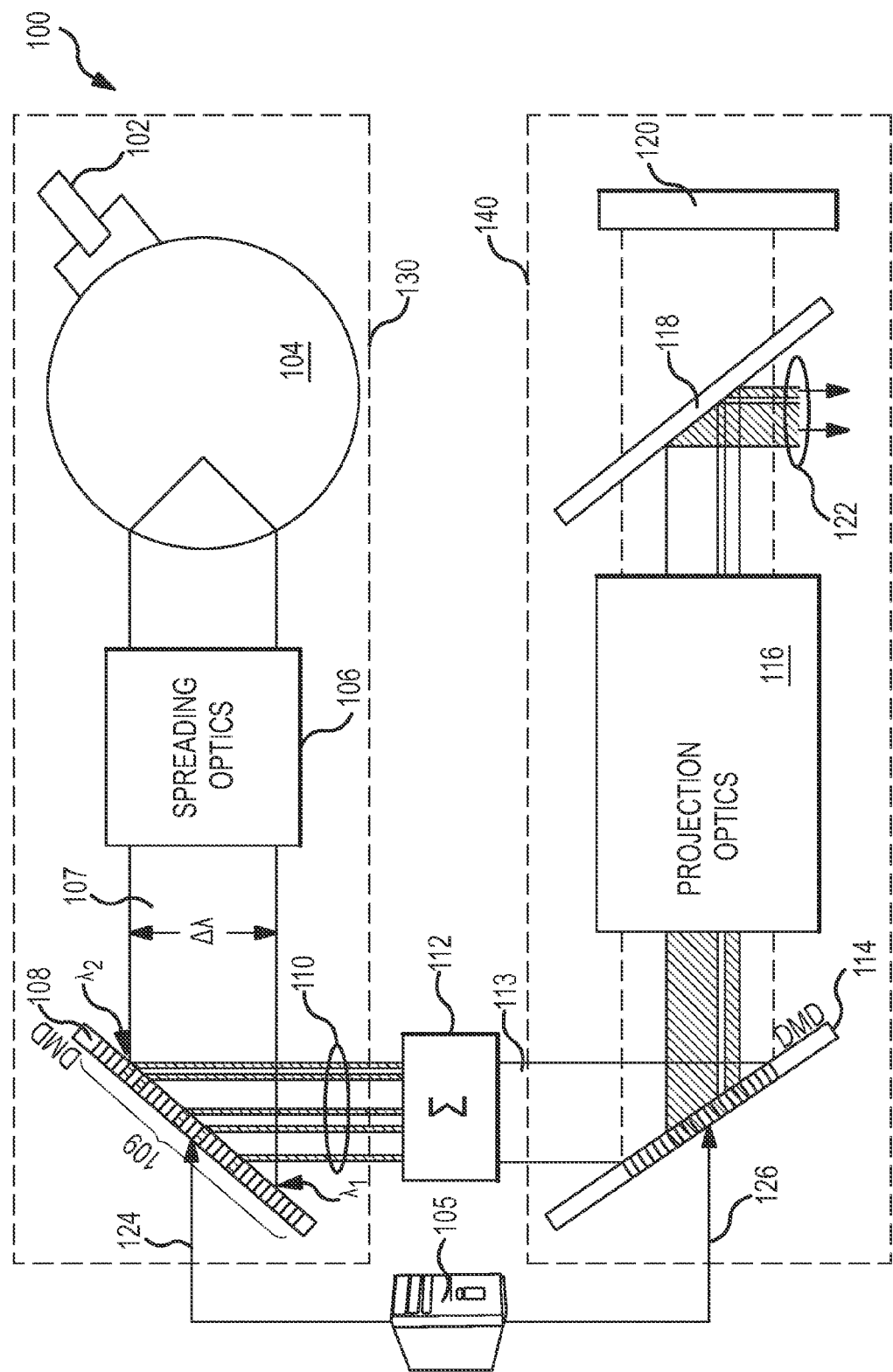

The following detailed description is merely exemplary in nature and is not intended to limit the invention or the application and uses of the invention. Furthermore, there is no intention to be bound by any theory presented in the preceding background or the following detailed description.

According to various embodiments, a digital micro-mirror device (DMD) can be used as a spatial light modulator or other switching element to process thermal spectra. Because DMD devices switch optical signals using reflective mirrors, these devices can be used to modulate, switch or otherwise process light in non-visible wavelengths. Infrared or ultraviolet light, for example, could be readily modulated, switched or otherwise processed using the techniques described herein. For example, non-visible wavelengths (e.g., long-wave infrared light having wavelengths from about 7 to about 14 micrometers or so, as well as other infrared or non-visible light having any other wavelengths) could be readily reflected, and therefore modulated, using DMD devices. This feature allows for simulation and projection of thermal spectra and the like. Hence, a DMD can be used as a spatial light modulator for light in non-visible, as well as visible, spectra.

Moreover, by spreading the wavelengths of light presented across the switching surface of the DMD, certain wavelengths can be selected for further processing while other wavelengths are rejected. This allows the user to create light having any programmable spectral characteristics. The light created may then be projected, applied to a sensor, or used for any other purpose. Diurnal solar spectra, for example, can be simulated with a relatively high level of accuracy.

Other embodiments apply pre-determined modulation templates to light received at a DMD to detect the presence of chemical substances. Examples of substances that may be detected by various embodiments include, without limitation, nuclear/biological/chemical (NBC) substances, explosive substances, drugs or other illegal substances, or any other substances as desired.

For convenience, the following discussion often references certain concepts with reference to light projection or substance detection systems. Other embodiments, however, may apply equivalent concepts to any number of other applications or settings. For example, DMD switching, modulation or selection may be readily applied to any applications relating to thermal spectra processing, including such military applications as target acquisition, surveillance and night vision, as well as in non-military applications such as thermal efficiency analysis, remote temperature sensing, short-ranged wireless communication, spectroscopy, weather forecasting, and infrared astronomy. By using a DMD to modulate light in non-visible spectra (e.g., the long wave infrared range commonly associated with many thermal imaging applications), any number of benefits and features can be realized across a wide array of alternate but equivalent embodiments.

Turning now to the drawing figures and with initial reference to FIG. 1, an exemplary system 100 for generating and projecting a programmed thermal spectrum suitably includes a spectral generator 130 and a spectral projector 140 optically coupled by a spatial integrator 112 as appropriate. Spectral generator 130 as shown in FIG. 1 includes a light source 102, an integrating sphere 104, wavelength-spreading optics 106, and a first digital micro-mirror device (DMD) 108. Light 110, which has programmed spectral characteristics based upon the switching modulation applied by DMD 108, is provided to a spatial integrator 112. The spatially-integrated light 113 is then projected by projector 140 and/or otherwise further processed as desired. In the projection system 100 shown in FIG. 1, spectral projector 140 includes a second DMD 114 and appropriate projection optics 116, as well as any other optics for calibration (e.g., calibration sensor 120) and/or output generation (e.g., flip mirror 118) as desired.

DMDs 108 and 114 are controlled in response to signals 124, 126 (respectively) that are produced by a digital computer or other controller 105. Controller 105 is any sort control device capable of producing control signals 124 or 126. In various embodiments, controller 105 is implemented with any sort of personal computer, workstation, microcontroller, embedded control logic or other hardware. Such hardware will typically include any sort of conventional processing circuitry (e.g., a microprocessor or microcontroller), memory, input/output features and the like. The hardware executing within controller 105 implements the various control techniques described herein using any convenient software, firmware or other control logic, as described more fully below. Although FIG. 1 shows a common controller 105 providing both control signals 124, 126, other embodiments may generate and provide signals 124 and 126 from different control devices.

The wavelengths of light provided in spectrum 110 may be programmably controlled by DMD 108, and any imagery or other spatial-domain features in output 122 may be controlled by DMD 114. In the embodiment shown in FIG. 1, light produced by source 102 and integrating sphere 104 is wavelength-separated by a grating or other optics 106 so that a spectrum of light 107 separated by wavelength is provided to the switching surface of DMD 108. In the embodiment shown in FIG. 1, the spectrum 107 is progressively spread such that shorter wavelengths (e.g., $\lambda_1$) are present at one side of the spectrum, and longer wavelengths are (e.g., $\lambda_2$) are present at the opposite side of the spectrum. This results in a progressive gradient of light wavelengths across the array 109 of mirrors on DMD 108. Each of the mirrors in array 109 on DMD 108 is then switched or otherwise controlled so that only those wavelengths of interest are reflected away from the DMD 108.

DMD 108 is thusly configured (e.g., by signal 124) to reflect only certain wavelengths of received light through selective actuation of the various mirrors in array 109. The selected wavelengths may be programmed or otherwise extracted from the remaining light in spectrum 107 by spreading the wavelengths of light 107 arriving on array 109 of DMD 108 by wavelength, and then activating and deactivating appropriate mirrors on DMD 108 to select only the wavelengths of interest. The wavelengths of interest can therefore be separated from the remaining components and reflected for further use, thereby creating a broadband light source that generates light 110 having components with programmable wavelengths. This light may be spatially integrated to create a pseudo-white-light 113 made up of only desired wavelength components.

Similarly, spatial features (e.g., imagery) in the output light 122 can be controlled with signal 126 provided to DMD 114 using conventional spatial modulation techniques. Activating and deactivating micro-mirrors on DMD 114 corresponding to "pixels" of the desired imagery can therefore allow any sort of imagery to be created from the output light 122.

By selecting desired wavelengths of light with DMD 108 and the selecting desired imagery using DMD 114, a highly configurable broadband light source/projector system 100 can be created. Such a system 100 could be used, for example, to simulate a diurnal solar spectrum, including infrared or other non-visible components. By adjusting DMD 108, changes in the wavelengths of light occurring as the sun progresses across the sky from sunrise to sunset can be modeled. DMD 114 could similarly model changes in light intensity occurring throughout the course of the day. Additional detail about an exemplary environment for simulating solar or other thermal spectra is described below in conjunction with FIG. 4.

Other embodiments could simulate and/or project thermal spectra associated with battlefield conditions or any other phenomena as desired. System 100 could be used, for example, to generate a thermally-correct image that could be provided to any sort of image projection chamber for projection toward any system under test. Such spectra may be highly useful in testing electro-optical (EO) infrared (IR) subsystems, missile seeker systems, and/or any other systems as desired. Light 122 could be applied to a sensor in a battlefield simulation, for example, to simulate thermal conditions experienced during combat by an aircraft, missile, vehicle, soldier or other manned or unmanned resource. Projection system 100 could also be used to project a thermally-correct but temporally changing thermal image onto any surface (e.g., an aerodynamic surface such as a wing, airfoil, vehicle exterior or the like). In such embodiments, DMD 108 could be directed to produce a thermal image that simulates thermodynamic loading of the surface, including turbules, eddy currents and/or other effects as appropriate. This image could be used to produce a corresponding projection of the actual thermodynamic loads on the surface itself, using any technique for amplification of the thermal energies identified the generated image.

While additional details of an exemplary spectral generator 130 and an exemplary spectral projector 140 are described below, it should be noted that any number of equivalent variations could be formulated. Programmed spectra 110 or integrated light 113 need not be provided to a projection system 140 in all embodiments; to the contrary, light 110 or 113 could simply be treated as the output of a programmable broadband light source suitable for any application. Such light 110 or 113 could be provided to any sort of test equipment, for example, to simulate spectral conditions that may be experienced in real-world conditions. Programmed light 113 could also be used to detect chemical or other known substances in input light, as described more fully below.

Figure 2:
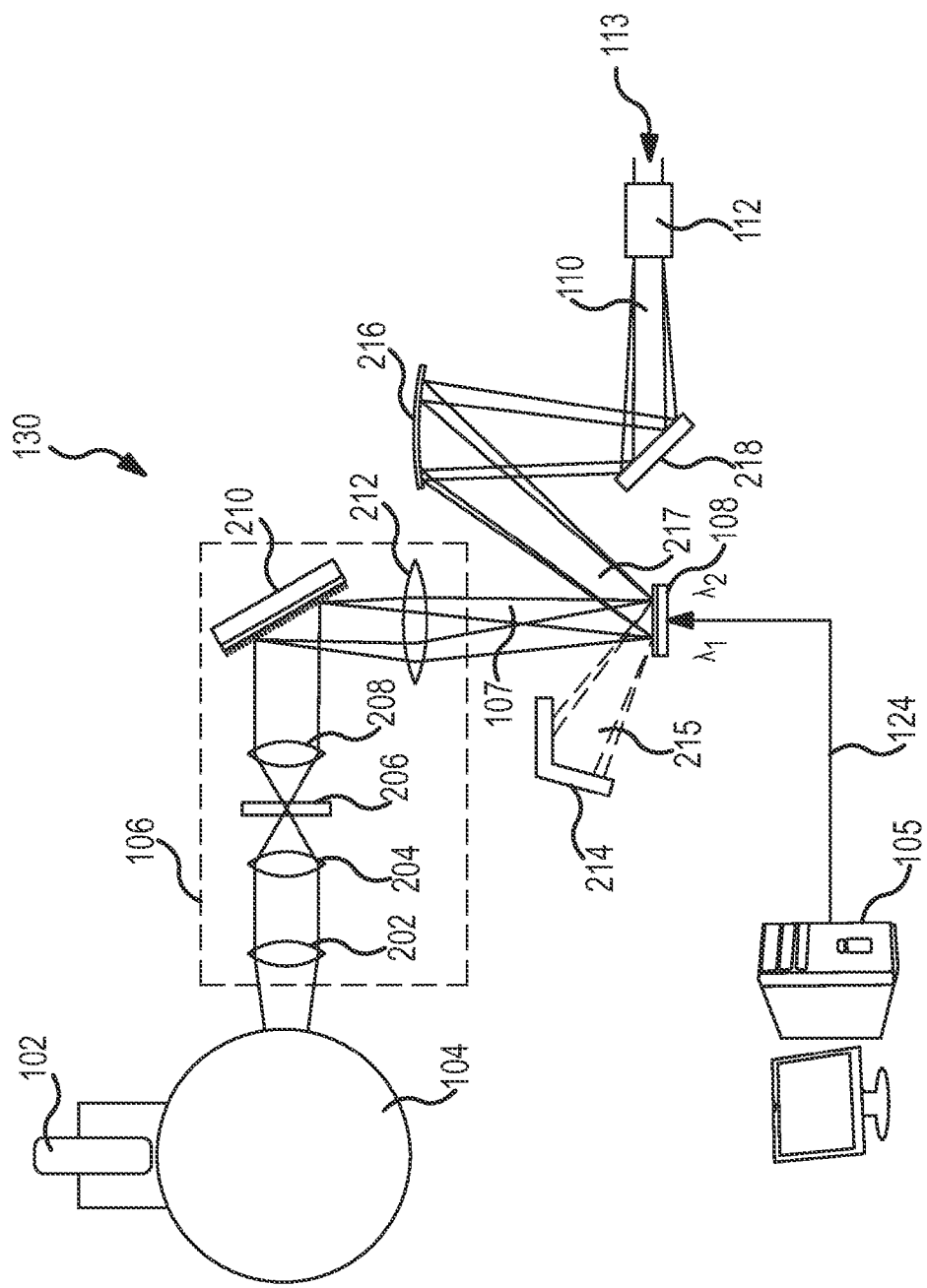
FIG. 2 is a block diagram of an exemplary optical system for generating thermal spectra.

Referring to FIG. 2, an exemplary spectral generator 130 suitably includes light spreading optics 106 and a digital mirror device 108 as described above. Various embodiments may further provide a light source 102, an integrating sphere 104, a beam dump 214, transfer optics 216 and 218, and any other features as desired. As noted above, light produced by source 102 is wavelength-spread into an input spectrum 107 that is provided on the switching surface of DMD 108. By selecting and activating particular mirrors in DMD 108, desired components 217 of input spectrum 107 can be reflected toward an output beam 110, while remaining components 215 are reflected in other directions, or are processed in another suitable manner. The light 110 emanating from spectral generator 130 therefore includes only the desired wavelength components of the input light, including wavelengths from non-visible (e.g., infrared) spectra. This output light 110 may be provided to a spatial integrator 112 or otherwise processed to create pseudo-white light 113 made up of selected spectral components, as desired.

Light source 102 is any source of optical, infrared, ultraviolet or other light that can be processed within spectral generator 130. In various embodiments, light source 102 is a radiant light source such as a conventional laser light source, although other embodiments may use light from fluorescent, incandescent or other coherent or non-coherent sources as desired. In embodiments that produce light having a spatial component, it may be beneficial to remove this component before it reaches optics 210, although this is not strictly necessary in all embodiments.

Light produced by source 102 may have any spectral characteristics as desired. In various embodiments that are used to generate programmed spectral characteristics in output light, it may be desirable to provide light 107 having a variety of wavelengths that can be activated or deactivated for maximum flexibility in output light 110, 113. To that end, light produced by source 102 (or received from any external source) may be processed as desired to provide substantially white light across the wavelengths of interest. To that end, FIG. 2 shows system 130 as including an integrating sphere 104 which serves as a diffuser for collecting all of the light emanating from source 102 and providing a source light having a range of wavelengths.

The light emanating from integrating sphere 104 is provided to any sort of input optics 106 that generate input spectra 107 from the input light. In the exemplary embodiment of FIG. 2, input optics 106 suitably include an input lens 202, a pinhole 206 (with associated input and output lenses 204 and 208), a grating 210 and an output lens 212. Input lens 202 may be any sort of conventional lens used to focus or otherwise process the light received from the integrating sphere 104. This light may be provided through pinhole 206 to remove unwanted modes, particularly when source 102 is a laser or similar active source. The resulting light is focused by lens 208 on grating 210, which suitably collimates or otherwise spreads the received light by wavelength, thereby allowing a range of wavelengths in input spectrum 107 to be provided across the sensing array log of DMD 108. To that end, grating 210 is any sort of diffraction component or the like capable of splitting received light into different components according to the wavelength of the light. Grating 210 may be equivalently replaced by any other optical component capable of spreading the received light according to the wavelengths of its components. Such optics may include any sort of collimating or other optics, including an additional digital micro-mirror device having mirrors sensitive to different wavelengths. Many different types of spreading optics could be formulated in any number of equivalent embodiments.

The various beams of different wavelengths are focused by lens 212 on DMD 108 to thereby allow selection and reflection of particular wavelength components of light 107. As noted above, DMD 108 is any sort of digital micro-mirror device capable of individually reflecting certain components of light impinging on the reflective surface of the device. In various embodiments, DMD 108 includes any sort of substrate with an array of micro-machined layers disposed thereon. Such mirrors may include aluminum or other reflective material that is placed on the substrate using micro-electro-mechanical (MEMS) or similar techniques. The mirrors may be arranged in any manner (e.g., in a two-dimensional "row-column" type array, although other embodiments may provide one-dimensional arrays log as appropriate) to allow individual selection and reflection of the particular light impinging on each mirror. In such embodiments, components of light 107 spread across the reflective array log could be selected by activating one dimension (e.g., columns) of mirrors corresponding to the wavelengths of interest. The intensity of each selected wavelength could be further controlled by adjusting the number of active mirrors in the orthogonal direction (e.g., the rows of the array). Other arrays and switching arrangements could be formulated in any number of equivalent embodiments, however. Various types of DMDs are commercially available from the Texas Instruments Corporation of Dallas, Tex., or any number of other sources.

As noted above, DMD 108 suitably responds to control signal(s) 124 to place each of the mirrors in the array into a desired state for reflecting selected wavelengths 217 of the received spectrum 107. Other components 215 of light 107 that are not selected to be switched toward output 110 of system 130 may be handled in any manner. In various embodiments, a beam dump 214 or other energy sink is provided. Other embodiments may simply absorb the non-selected components 215 of spectrum 107 as heat energy at DMD 108, or any other location. Still other embodiments may provide a detector in place of or in addition to beam dump 214 to measure the intensity of received spectrum 107, or for any other purpose.

Components 215 that are selected for reflection by DMD 108 may be further processed in any manner. In the embodiment shown in FIG. 2, mirrors 216 and 218 are used to direct the selected components 217 as desired to create any sort of output beam 110. As noted above, the output 110 may be spatially integrated (e.g., by spatial integrator 112) to create a pseudo-white light output 113 having programmable spectral components that is suitable for projection or further processing as desired.

Figure 3:
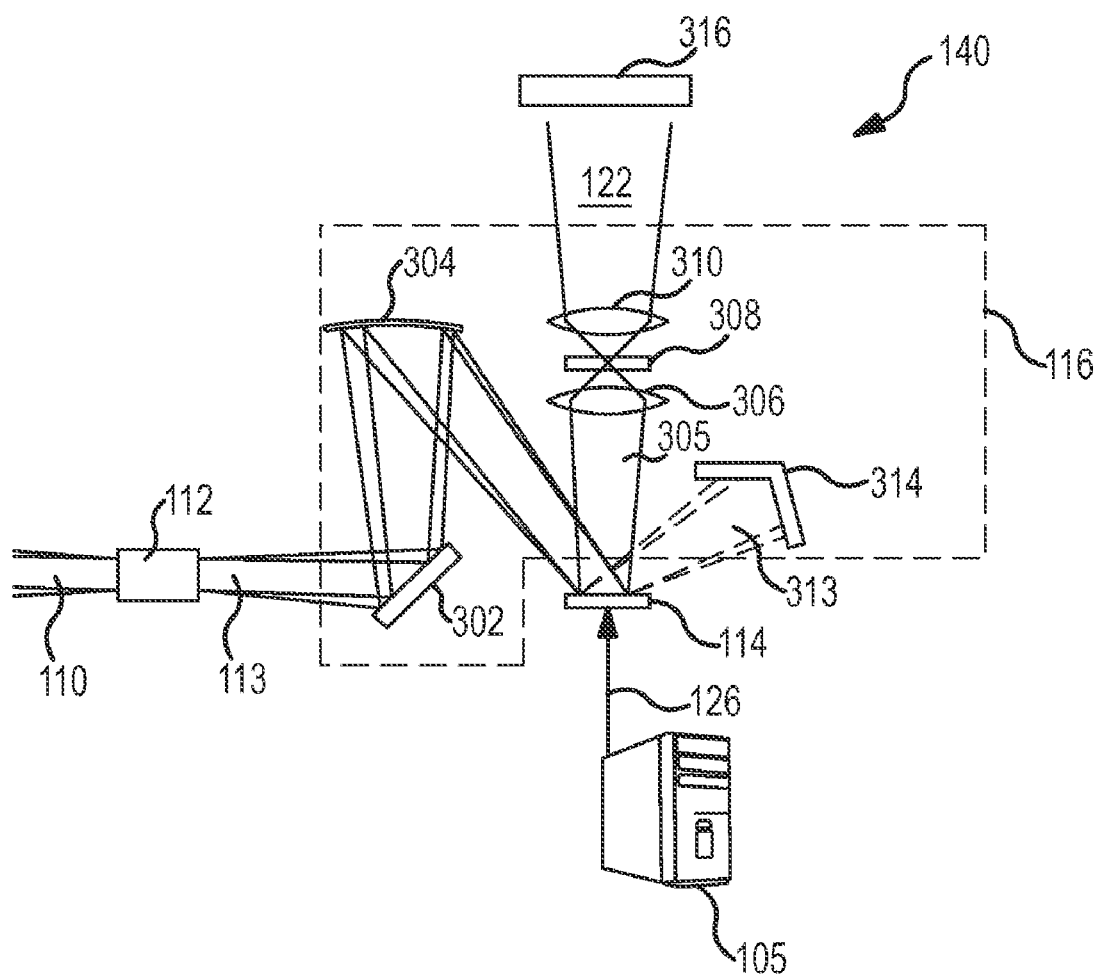
FIG. 3 is a block diagram of an exemplary optical system for projecting thermal spectra.

Referring to FIG. 3, an exemplary spectral projector 140 includes a second DMD 114 operating in conjunction with any sort of appropriate projection optics 116. In the exemplary embodiment of FIG. 3, projection optics 116 suitably includes mirrors 302 and 304, as well as lenses 306 and 310, pinhole 308 and beam dump 314. The various optical components in optics 116 may be replaced, supplemented, modified or differently arranged in any number of alternate but equivalent embodiments.

In the embodiment of FIG. 3, spatially-integrated light 113 is received from a spatial integrator 112 and provided to DMD 114 via any number of mirrors 302, 304, lenses or other optics. Like DMD 108 described above, DMD 114 includes a single or multi-dimensional array of micro-machined mirrors to allow for spatial modulation of received light as desired. In various embodiments, each mirror in the array may be switched to reflect light corresponding to a particular pixel of the resulting image using conventional spatial light modulation techniques. Selected light 305 is therefore reflected from the active pixels toward the output light 122, whereas rejected light 313 can be absorbed, transmitted toward a light dump 314, provided to a detector to aid in calibration, or otherwise handled in any appropriate manner. As noted above, the particular mirrors on DMD 114 can be activated or otherwise oriented in response to any number of control signals 126 provided from a digital computer or other controller 105. Reflected light 305 is directed toward any sort of output optics, such as the combination of lenses 306, 310 and pinhole 308 shown in FIG. 3. While other embodiments may use different components and features, the illustrated implementation would allow for removal of unwanted spatial modes by pinhole 308, as well as for suitable projection of images created by DMD 114 toward any sort of receiver 316.

The light 122 produced by projection system 140 is therefore projected toward receiver 316 as desired. In various embodiments in which projection system 140 receives input light 113 from a spectral generator 130 as described above, light 122 can be provided with any desired spectral and spatial characteristics, and applied to any sort of receiver 316 as desired.

Because spectral generator 130 and spectral projector 140 make use of mirror-based modulation devices, these systems are capable of transmitting light having wavelengths in the non-visible ranges. The ability to generate and project light having desired spectral characteristics, particularly in the infrared or other non-visible spectra, allows for any number of convenient and useful applications. In embodiments wherein receiver 316 is a thermal or other sensor (e.g., a sensor associated with a missile, projectile, aircraft or other device), for example, a programmed spectra 122 could be used to test the sensor or the device under desired thermal conditions. The particular thermal conditions may be readily adjusted or varied over time by simply adjusting the control signals 124, 126 generated by controller 105 and provided to DMDs 108, 114, respectively. Diurnal solar spectra, for example, could be simulated by adjusting the spectral and spatial characteristics of light 122 to simulate changes in solar radiation throughout the course of the day.

Figure 4:
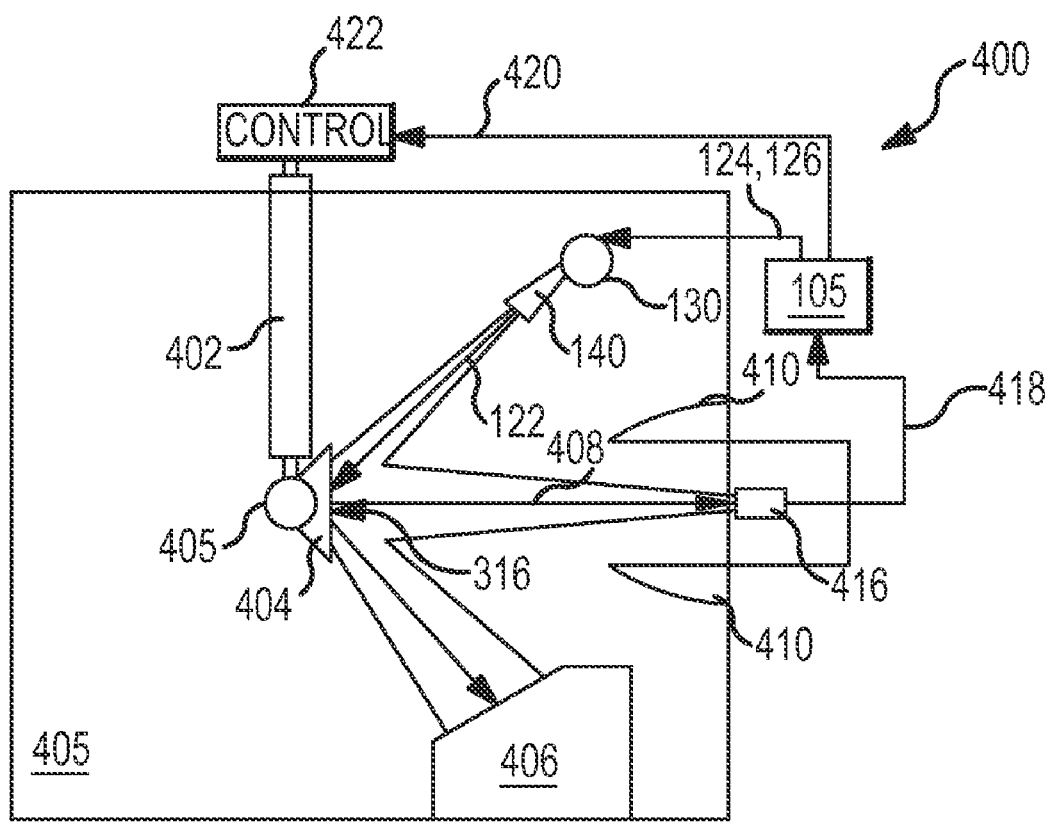
FIG. 4 is a diagram of an exemplary environment for simulating solar or other thermal spectra.

FIG. 4 describes one exemplary environment 400 for simulating diurnal solar spectra or for otherwise projecting light 122 having programmed spectral characteristics toward a receiver 316. In this example, a spectral generator 130 and spectral projector 140 are provided within a confined chamber 405 that is configured to provide a relatively cold and dark environment for minimizing interference with spectral or thermal tests carried out within the chamber. Receiver 316 (representing the device or sensor under test) is placed within a receptacle 404 so that light 122 can be directed toward the receiver 316. In the embodiment shown in FIG. 4, the receptacle 404 is attached to a control arm 402 with a gimbal 405 or other structure that allows for movement of receiver 316. Control arm 402 and gimbal 405 may allow for movement in any number of directions (e.g., three degrees of freedom) to position and/or orient receiver 316 as desired for receiving light 122. Arm 402 and/or gimbal 405 may be manually positioned, or may be positioned as desired by any sort of motor or other suitable control apparatus 422.

Light 122 is provided from projector system 140 as described above. In the embodiment shown in FIG. 4, light 408 is reflected from receiver 316 toward a camera, sensor or other light collector 416. Other reflected light may be directed toward a light trap 406, as desired, to reduce reflections and other noise within chamber 405. Chamber 405 may also include a thermal shroud 410 that further prevents unwanted reflections from reaching collector 416.

The test environment 400 may be operated in any manner. In various embodiments, controller 105 generates control signals 124, 126 in the manner described above to produce output light 122 having desired spectral and spatial characteristics. Controller 105 (or any other control circuitry or logic) may also produce control signals 420 that can be used to reposition the receiver 316 under test (e.g., by adjusting control arm 402 and/or gimbal 405 using control apparatus 422). In various embodiments, the control signals 124, 126, 316 may be adjusted based upon feedback 418 received from collector 416 or any other sensor in chamber 405 as desired. Controller 105 may be further configured to adjust the various control signals 124, 126, 316 as desired to simulate changing phenomena (e.g., solar position) over time. This may be accomplished by adjusting the relative and absolute amounts of visible and non-visible light of various wavelengths as the simulated "day" progresses. At simulated "noon", for example, the total amount of visible and non-visible light is typically greatest, but the relative proportion of infrared (and ultraviolet) light to visible light is greatest at simulated "dawn" and "dusk". These variations in the light produced can be implemented by adjusting the active and inactive mirrors on DMDs 108 and 114, as described above. By varying the absolute and relative amounts of light at various wavelengths, then, a solar "day" can be readily simulated. The resulting simulated solar radiation can then be projected toward the receiver 316, and any reflections or other effects can be recorded as desired.

Figure 5:
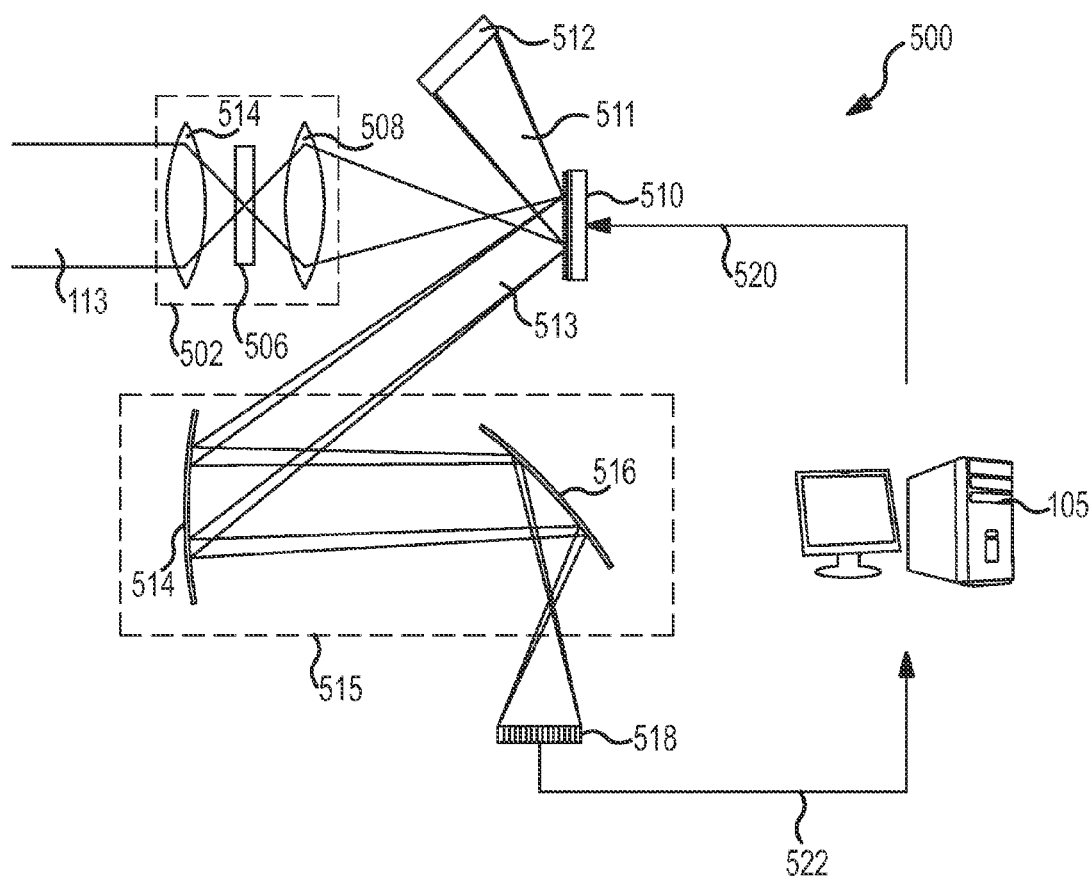
FIG. 5 is a block diagram of an exemplary optical system for detecting the presence of known substances in a received optical signal.

While the above embodiments have used light sources (e.g., source 102) that generate light within the system, other embodiments could use DMD devices to process light received from any other source. FIG. 5, for example, shows one embodiment of a spectral correlation system 500 that allows incoming light 113 to be modulated as desired by DMD 510 to identify particular spectral characteristics, such as the spectra of particular substances (e.g., nuclear/biological/chemical substances, explosives or components of explosives, drugs or other illegal materials, and/or the like). That is, the presence of spectral characteristics associated with substances of interest can be readily detected by applying a proper modulation template to the received light using a DMD, and then processing the modulated light reflected by the DMD.

In the exemplary embodiment shown in FIG. 5, received light 113 is initially transformed (e.g., using a Fourier transform) from a spatial image into a frequency domain representation. That is, received light 113 is separated into its component wavelengths using any sort of spreading optics 502, which in this example includes two lenses 504 and 508 separated by a pinhole 506. In other embodiments, spreading optics may be implemented using structures similar to optics 106 described in FIGS. 1-2. In addition to separating received light 113 into various wavelength components, optics 502 may also perform any filtering, shaping, focusing or other optical processing on received light 113 as desired.

The transformed/wavelength-spread light is then applied to the DMD surface. Using techniques similar to those described above, each mirror on the DMD array can be positioned as appropriate to reflect desired light 511 for further processing. Undesired components 511 of light 103 are absorbed, directed toward a light dump or calibration detector 512, or otherwise processed as appropriate. The particular light 513 is selected through proper application of a modulation template that is generated at controller 105 and represented by signal 520 to place DMD 510 into the desired modulation state. This template generally represents frequency domain spectral characteristics of the substance to be detected. That is, DMD 510 is generally directed by signal 520 to reflect only those portions of light 103 that are known to be part of the spectrum associated with the substance of interest.

Reflected light 513 may be further processed in any manner. In the exemplary embodiment of FIG. 5, light 513 that is reflected from DMD 510 is inverse-Fourier transformed using reflective optics 514 and 516. Other embodiments may perform the inverse-transform using refractive optics, or any combination of reflective and refractive optics. Still other embodiments may simply directly detect the reflected light 513 at any suitable detector 518 to perform the inverse-transform (or any other processing) digitally rather than (or in addition to) optically.

The processed light is ultimately sensed using a camera, photo-detector or other appropriate detector 518 that provides an electrical or electronic signal 522 that can be processed by controller 105. In general, an image of the received light is captured digitally (or otherwise) for subsequent digital processing within controller 105. Image capture may be performed in any manner, and at any frequency using conventional techniques.

By applying a template modulation to the received light 113 at DMD 510 and then sensing the light passed by the modulation at detector 518, the presence or absence of spectral components corresponding to substances of interest can be detected. In various embodiments, detector 518 is a correlation plane detector that allows for spatial correlation between components of received light 113 and the modulated template applied by DMD 510 so that the location of any substances of interest can be determined from the image obtained at detector 518.

Figure 6:
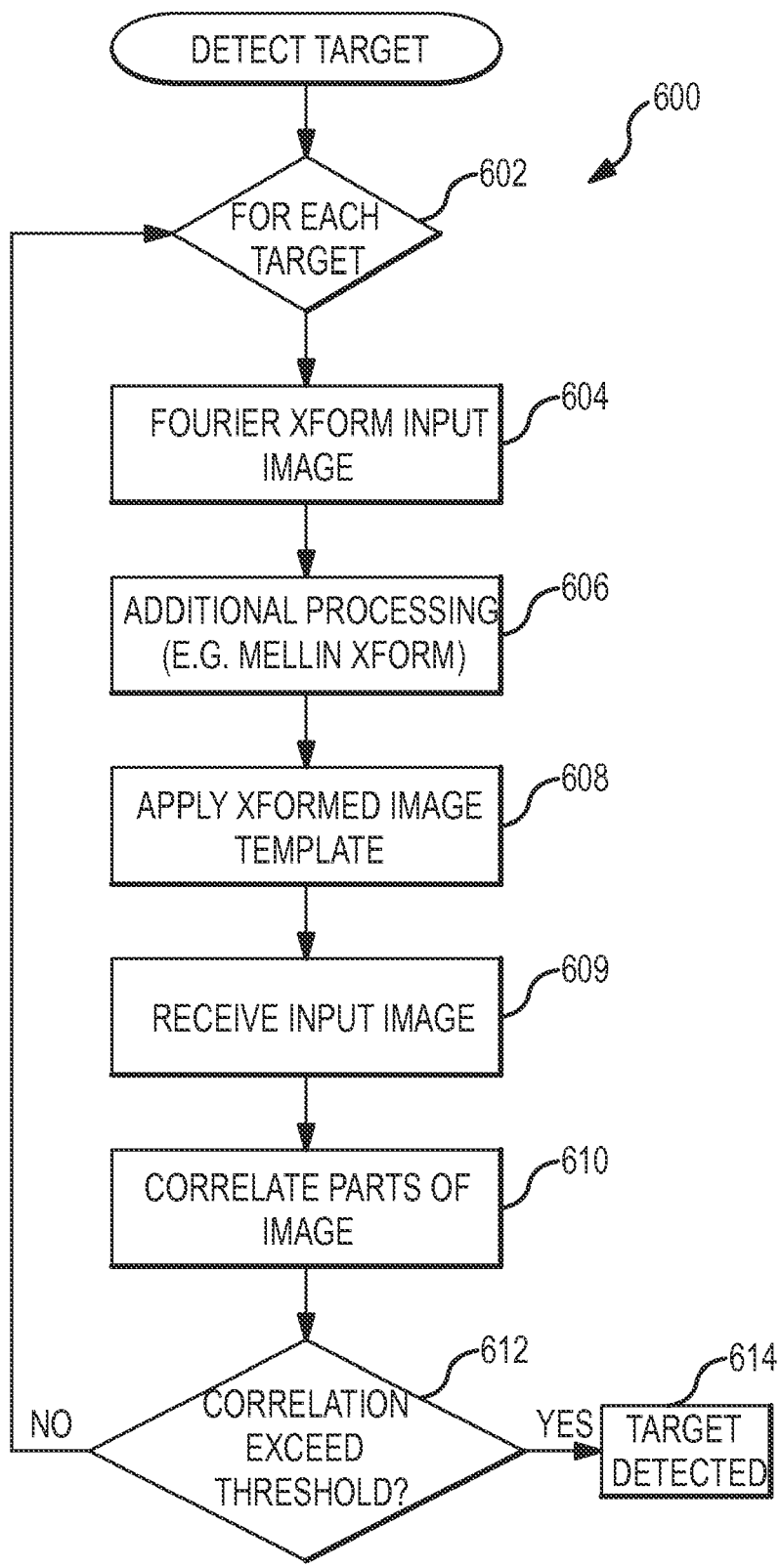
FIG. 6 is a flowchart of an exemplary technique for processing programmable thermal spectra.

FIG. 6 shows a flowchart of the various functions involved in detecting a target substance based upon received light 113 according to one exemplary embodiment. Generally speaking, received light 113 is wavelength-spread, Fourier transformed and/or otherwise processed to provide light in a suitable format to DMD 510 (functions 604, 606). A modulation template is formed based upon known spectral information and the template image is applied to DMD 510 (function 608) to generate an output image (function 609) that can be correlated with the original template image (function 610). If significant correlation is identified (function 612), then the target substance is detected (function 614). The process 600 may be repeated for any number of other substances (function 602), or multiple substance spectra can be combined into common templates, in some embodiments.

As noted above, input light 113 is adjusted as appropriate to produce light in a predictable format at DMD 510. In various embodiments, the input light 113 is Fourier-transformed or otherwise processed (function 604) so that light of different frequencies/wavelengths is spread across the surface of DMD 510, as noted above. In various embodiments, a Mellin transform or the like is also performed (function 606) on the Fourier-transformed light using conventional reflective, refractive or other optical techniques. The Mellin transform may improve the rotation and/or scale invariance of the imagery resulting from detector 518, as desired.

The template applied to DMD 510 may be applied in any manner (function 608). In various embodiments, it is desirable to reflect portions of the received light 113 that correspond to known spectra of known detectable substances. If the received light contains spectral components that correspond to those of the known substances, then the presence of the known substance can be deduced. DMD 510 is therefore configured (using any number of signals 520 from controller 105) to reflect those portions of light 113 that correspond to the spectral components of the known substances. Hence, mirrors in DMD 510 that are located where the known spectral components are expected to impinge can be activated to reflect those components, while mirrors at other locations can be deactivated or otherwise oriented so that undesired light 511 is directed away from the selected light 513.

To activate the desired mirrors in DMD 510, then, it is desirable to identify those mirrors corresponding to the spectral components of interest and to correlate these components to the mirrors where corresponding components of input light 113 are expected to impinge. Templates applied to DMD 510 can be formulated to reflect Fourier transforms, Mellin transforms and/or other processing of input light 113 by optics 502. Generally speaking, the template represents the image on the switching surface of DMD 510 that light emanating from the known substance would produce. That is, the image will activate mirrors on DMD 510 that would be expected to reflect light if the known substance is present. Other mirrors on DMD 510 that would not be expected to reflect light in the spectra of the known substance can then be de-activated. The template information as to which mirrors should be activated or deactivated may be obtained, for example, from empirical testing or other data. Such information may be stored within controller 105 for any number of different substances (function 602), with different templates applied to input light 113 according to any temporal scheme (e.g., time domain multiplexing).

When proper modulation is applied at DMD 510, controller 105 is able to detect the target substance in the signal 522 received from detector 518 (function 609). In various embodiments, signal 522 represents the comparative signal strength between the target and target like objects within the scene. If the signal received at detector 518 exceeds an appropriate threshold value (function 612), then the target substance can be detected (function 614) in the received light 113. Such thresholds may be empirically determined from experimental results. If the target substance is identified, then an appropriate response (e.g., a warning or alarm) can be provided. In other embodiments, an output image that shows the relative location of the detected substance within the field of view of input light 113 may be additionally or alternately provided.

The various functions shown in FIG. 6 may be implemented in any manner. In various embodiments, many of the functions are implemented using controller 105 in response to software or firmware instructions written in any programming or scripting language. Such instructions are typically stored in a memory, disk or other mass storage device associated with controller 105 until being transferred to digital memory just prior to execution on any sort of microprocessor, microcontroller, digital signal processor, or other programmable processing device. The particular means for executing each of the functions shown in FIG. 6, then, is programmable logic executing within controller 105 in some embodiments. Other embodiments may perform certain functions (e.g., wavelength spreading) using optical techniques rather than digital processing techniques, as described herein. Functions 604 and 606 in FIG. 6, for example, may be performed by optics 106, optics 502 and/or any other structures that are presently known or subsequently developed.

Various systems and techniques for processing infrared or other non-visible light associated with thermal spectra are therefore described. In many of these examples, the micromachined mirrors of a DMD device are used to switch or otherwise modulate light or heat (as infrared light). This basic concept may be applied in any number of settings to allow for convenient optical processing of thermal spectra. As noted at the outset, these techniques and systems may be variously applied in any military, industrial, commercial, personal or other setting for image processing or projection, target/object recognition, solar spectral simulation, substance detection, light modulation and/or other benefits as appropriate.

As used herein, the word "exemplary" means "serving as an example, instance, or illustration". "Exemplary" embodiments are not intended as models to be literally duplicated, but rather as examples that provide instances of embodiments that may be modified or altered in any way to create other embodiments. Any implementation described herein as "exemplary" is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. Various changes may be made in the function and arrangement of elements described without departing from the scope of the invention and its legal equivalents.

What is claimed is:

1. An optical system for creating an output spectrum based upon an input light, the system comprising:
spreading optics configured receive the input light and to spread the input light by wavelength into an input spectrum; and
a digital micro-mirror device configured to controllably activate a plurality of mirrors to reflect only portions of the input spectrum corresponding to a plurality of selected wavelengths of the input light and to thereby extract only portions of the input light having the selected wavelengths from remaining portions of the input light for the output spectrum.

2. The optical system of claim 1 wherein the extracted portions have selected wavelengths within the infrared spectrum.

3. The optical system of claim 1 wherein the digital micromirror device comprises a substrate, and the plurality of mirrors comprises an array of micro-machined mirrors disposed on the substrate.

4. The optical system of claim 1 further comprising a light source configured to generate the input light and a spatial integrator configured to combine the portions of the input light having the selected wavelengths into the output spectrum.

5. The optical system of claim 4 further comprising a spatial light modulator configured to adjust the output spectrum and projection optics configured to project the adjusted output spectrum.

6. An optical system for creating an output spectrum based upon an input light, the system comprising:
a light source configured to generate the input light;
spreading optics configured receive the input light and to spread the input light by wavelength into an input spectrum;
a first digital micro-mirror device configured to receive the input spectrum and to controllably activate a first plurality of mirrors corresponding to a plurality of selected wavelengths of the input light and to thereby extract only portions of the input light having the selected wavelengths from remaining portions of the input light for the output spectrum:
a spatial integrator configured to combine the portions of the input light having the selected wavelengths into the output spectrum;
a spatial light modulator configured to adjust the output spectrum, wherein the spatial light modulator is a second digital micro-mirror device comprising a second plurality of minors; and
projection optics configured to project the adjusted output spectrum.

7. The optical system of claim 1 further comprising a computer configured to activate each of the plurality mirrors to thereby allow each of the mirrors to reflect a portion of the input spectrum that impinges upon the activated mirror.

8. An optical system for creating an output spectrum based upon an input light, the system comprising:
spreading optics configured receive the input light and to spread the input light by wavelength into an input spectrum;
a digital micro-mirror device configured to receive the input spectrum and to controllably activate a plurality of mirrors corresponding to a plurality of selected wavelengths of the input light and to thereby extract only portions of the input light having the selected wavelengths from remaining portions of the input light for the output spectrum; and a computer configured to activate each of the plurality mirrors to thereby allow each of the mirrors to reflect a portion of the input spectrum that impinges upon the activated mirror, wherein the activated mirrors are selected by the computer based upon a template of a target image.

9. The optical system of claim 8 wherein the template of the target image corresponds to a spectrum of a known substance.

10. The optical system of claim 9 further comprising a detector configured to receive the output spectrum and to provide a signal to the computer that corresponds to the output spectrum, wherein the computer is further configured to detect a presence of the known substance based upon the signal received from the detector.

11. An optical system for projecting a programmable thermal spectrum, the optical system comprising:
a light source configured to provide an input light;
a grating configured to spread the input light by wavelength into an input spectrum, wherein the input spectrum lies at least partially within the infrared spectrum;
a first digital micro-mirror device comprising a first substrate and a first array of micro-machined mirrors arranged on the first substrate, wherein the first array of micro-machined mirrors is configured to receive the input spectrum and to reflect a selected portion of the input spectrum in response to a first control signal such that only those portions of the input spectrum having the selected wavelengths are extracted from remaining portions of the input light;
a spatial integrator configured to receive the extracted portions of the input spectrum and to integrate the extracted portions to create the programmable thermal spectrum; and
a second digital micro-mirror device comprising a second substrate and a second array of micro-machined mirrors arranged on the second substrate, wherein the second array of micro-machined mirrors is configured to receive the programmable thermal spectrum and to reflect only a selected spatial portion of the programmable thermal spectrum in response to a second control signal; and
projection optics configured to project the selected spatial portion of the programmable thermal spectrum.

12. The optical system of claim 11 further comprising a digital computer configured to generate the first control signal applied to the first digital micro-mirror device and the second control signal applied to the second digital micro-mirror device, wherein the first control signal is generated to activate only those micro-machined mirrors in the first array that correspond to portions of the input spectrum having wavelengths selected for the programmable output spectrum, and wherein the second control signal is generated to activate only those micro-machined mirrors in the second array that correspond to the selected spatial portion of the programmable thermal spectrum.

13. The optical system of claim 11 wherein the light source comprises an active light source configured to produce a substantially coherent light, an integrating sphere configured to produce a substantially white light from the substantially coherent light, and filter optics configured to produce the input light from the substantially white light.

14. The optical system of claim 11 wherein the first array of micro-machined mirrors is arranged into rows and columns, and wherein the first control signal is configured to activate only those columns of the array of micro-machined mirrors that correspond to portions of the input spectrum having the selected wavelengths, and wherein the first control signal is further configured to activate rows of the array of the micro-machined mirrors based upon a desired intensity of a portion of the input spectrum.

15. A method for optically creating a programmable thermal spectrum based upon a received input light, the method comprising:
spreading the input light by wavelength into an input spectrum, wherein the input spectrum lies at least partially within the infrared spectrum; and
controlling a plurality of mirrors on a digital micro-mirror device to reflect only portions of the input spectrum corresponding to a plurality of selected wavelengths of the light and to thereby extract only portions of the input light having the selected wavelengths from remaining portions of the input light for programmable thermal spectrum.

16. The method of claim 15 further comprising adjusting the plurality of mirrors in the digital micro-mirror device to produce different quantities and wavelengths of light in the programmable thermal spectrum over time to thereby simulate a diurnal solar spectrum.

17. The method of claim 15 further comprising determining a target image based upon a spectrum of a known substance and detecting the known substance based upon the programmable thermal spectrum, wherein the controlling comprises applying the target image to the plurality of mirrors of the digital micro-mirror device to thereby reflect portions of the input spectrum corresponding to the target image in the programmable thermal spectrum.

18. The method of claim 17 wherein the target image represents a Fourier transform of a view image associated with the known substance.

19. The method of claim 18 wherein the target image further represents a Mellin transform of the view image associated with the known substance.

20. The method of claim 18 further comprising performing an inverse Fourier transform of the programmable thermal spectrum and wherein the detecting of the known substance comprises correlating the inverse-transformed programmable thermal spectrum with the target image.

* * * * *